May 2, 1967
A. L. HUBBARD
3,316,697
PRESSURE PLATE ASSEMBLY FOR COTTON PICKER TUNNEL
Filed March 26, 1962
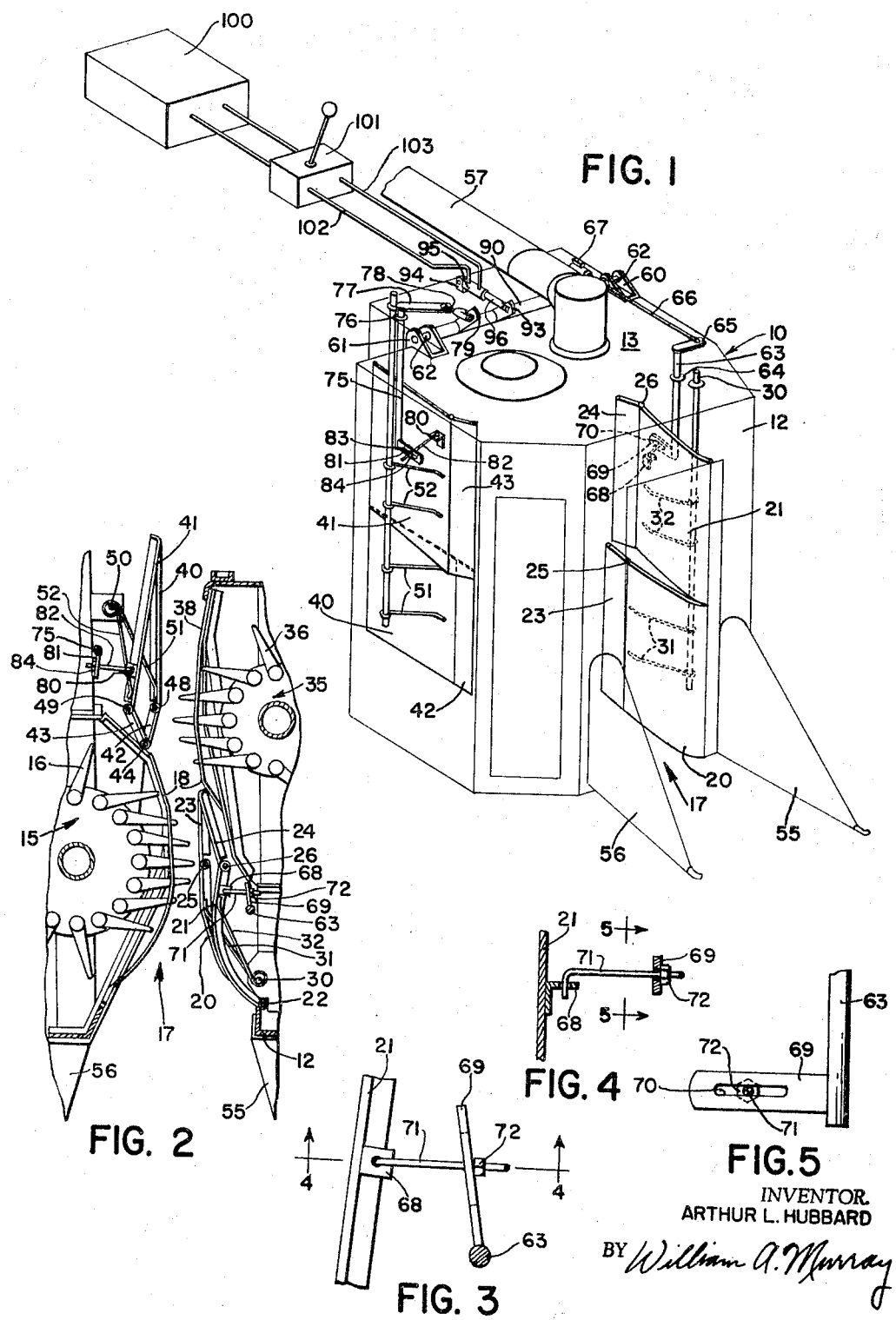
INVENTOR.
ARTHUR L. HUBBARD
BY William A. Murray
ATTORNEY

United States Patent Office 3,316,697
Patented May 2, 1967

3,316,697
PRESSURE PLATE ASSEMBLY FOR COTTON PICKER TUNNEL
Arthur L. Hubbard, Des Moines, Iowa, assignor to Deere & Company, Moline, Ill., a corporation of Delaware
Filed Mar. 26, 1962, Ser. No. 182,262
8 Claims. (Cl. 56—44)

This invention relates to a cotton harvester and more particularly to an improvement which features structure defining a plant passage for a cotton harvester that is adjustable to affect the effective harvesting rate of the harvesting mechanism relative to the upper portion of the plants.

It is a primary object of the present invention to provide a housing structure defining a plant passage which has upright side walls adjacent and on opposite sides of the passage with upper sections or portions thereof adapted to be moved laterally away from or toward the passage.

In the normal harvesting of cotton, it is often desirable to pick the ripe cotton bolls at the lower portion of the cotton plants and to leave the greener or upper bolls on the cotton plant. Normally the cotton plants have their cotton bolls ripen initially at the lower portions thereof while the upper portions retain the green or hard cotton bolls. However, if a cotton plant having only partially ripe bolls passes through a cotton harvester, often the upper or green cotton bolls are dislodged from the cotton plant. If not at a sufficiently mature stage, the cotton boll is lost once it is detached from the cotton plant.

In the conventional type cotton harvester there is provided a housing structure defining a fore-and-aft extending plant passage with upright wall structure on opposite sides of the plant passage. Adjacent the wall structure and internally disposed relative to the housing structure is a pair of upright drums having laterally extending cotton picking spindles extending into the plant passage which upon rotation of the spindles causes the cotton bolls to be snagged or harvested. Normally the conventional cotton harvester will have sufficient spindles to pick the ripe cotton from the entire height of the cotton plant. Directly opposite the spindles and on the opposite side of the plant passage is provided upright wall structure normally biased against movement away from the plant passage. The biasing force is created by means of spring fingers resting against the back side of the wall structure so that as the plant enters into the plant passage the biased wall structure will gently maintain the plant in close relationship with the spindles.

It is proposed in the present invention to provide the wall structures opposite the spindles in upper and lower sections, both of which have the conventional type biasing arrangement maintaining pressure of the plant against the cotton spindles. However, the upper sections of the wall structures will be attached by suitable linkage means to permit remote control of the upper sections so that upon moving into an area of a field in which the cotton plants are generally green at their upper portions, the upper sections of the wall structures may be drawn laterally away from the plant passage so as to remove the pressurized effect of the biasing means on the plant. This will greatly reduce the effectiveness of the spindles at the upper portion of the plant in relation to removing or dislodging the immature cotton bolls.

Other objects and advantages of the present invention will become apparent to those skilled in the art as the nature of the invention is better understood from the following description and as shown in the accompanying drawings.

FIG. 1 is a perspective view of a cotton harvester showing the harvester housing in representative form and the wall structure adjacent the plant passage in complete form.

FIG. 2 is a sectional plan view of the cotton harvester as shown in FIG. 1.

FIG. 3 is an enlarged plan view, partially in section, of a portion of the control mechanism of the upper wall structure adjacent the passage.

FIG. 4 is a sectional view taken substantially along the line 4—4 of FIG. 3.

FIG. 5 is a sectional view taken along the line 5—5 of FIG. 4.

Referring now to the drawings, the cotton harvester is nirmally contained within a picker housing, indicated in its entirety by the reference numeral 10, having an inverted U-shaped front wall 12 with a forwardly facing opening which receives the cotton plants as the harvester moves over the field. The harvester and housing, other than that of the present invention which will be set forth in detail, is of the type generally shown and described in U.S. Patent 2,904,948. The housing has an upper laterally disposed wall 13 directly under which is contained the driving gear or mechanism for the harvesting units.

The harvester is of conventional type having a forwardly disposed upright drum 15 with laterally extending spindles 16 projecting into a plant passage 17 for purposes of picking the ripened cotton bolls from the plant. The spindles 16 extend through side wall structure adjacent the passage 17, the side wall structure being composed of fore-and-aft extending bars 18 spaced vertically apart to permit the spindles to project therethrough. On the opposite side of the passage is upright housing structure composed of a lower upright fore-and-aft extending pressure plate or panel 20 and an upper vertically disposed fore-and-aft extending pressure plate or panel 21. The upper and lower panels 20, 21 are supported at their forward upright edges on a common vertical pivot pin 22 carried by the housing 10. Consequently the pressure plates 20, 21 are permitted, unless otherwise restricted, movement toward or away from the passage 17. Connected to the rear edges of panels 20, 21 are rear pressure plate extensions 23, 24. The extensions 23, 24 are pivotally connected by upright pivot rods 25, 26 to the rear edges of the respective forward pressure plates 20, 21.

Positioned behind the front pressure plates 20, 21 is a vertical rod 30 extending the entire height of the picker and having radial spring fingers 31, 32 engaging the back surfaces of the pressure plates 20, 21 respectively. The fingers 31, 32 normally retain the panels 20, 21 and their rear extensions 23, 24 in vertical alinement. However, the springs 31, 32 will yield sufficiently, that should a large plant or foreign object pass through the passage 17 they will permit the plant or foreign object to pass. Also, the pressure plates 20, 21 will normally maintain a slight pressure on the plant so that the spindles 16 can better engage the ripe cotton bolls on the plants.

A rear drum 35 on the left sides of the plant passage 17 has laterally extending picking spindles 36 projecting into the passage. A series of vertically spaced apart grid bars 38 are positioned adjacent the drum 35 and permit the spindles 36 to extend into the passage. On the right or the opposite side of the passage 17 and facing the drum 35 is a pressure plate structure consisting of a lower main panel 40, an upper main panel 41, a lower forward extension 42 and a forward upper extension 43. The forward edges of the extensions 42, 43 are connected by a common vertical rod 44 mounted on the housing structure 10. The main lower panel 40 and extension 42 are interconnected for relative lateral movement by a pivot rod 48. The upper panel 41 and its extension 43 are interconnected for relative lateral movemnt by a vertical connecting pin 49. Fixed to the housing behind the pressure plates 40, 41 is an upright rod 50 on which is carried a plurality of radially extending spring fingers 51, 52 behind the lower pressure panel 40 and the upper pressure panel 41 respectively. The fingers are positioned to engage the back surface of the panels 40, 41 and to resist movement of the panels 40, 41 and the extensions 42, 43 outwardly from the passage 17.

Other structure of the harvester is generally conventional such as forwardly extending gathering shoes 55, 56 which gather and feed the cotton plants into the plant passage 17 and the drive mechanism not shown, positioned beneath the panel 13. A remote power source contained under housing 57 extends from a remote power source to the cotton harvester and affords the power for operating the various units in the harvester.

A pair of upwardly projecting bracket structures 60, 61 is fixed to the upper wall 13 and rotatably supports a transverse shaft 62. Extending from the left end portion of the shaft 62 is a linkage connecting the upper and forward pressure panel 24 to the shaft 62. The linkage includes a vertically disposed rod 63 journaled, as indicated at 64, on the housing plate 13. The upper end of the rod or shaft 63 has an arm 65 with an outer end connected to the shaft 62 by means of a connecting rod 66. A radial arm, shown only partially at 67, is connected to the rear end of the rod 66 and is mounted on the shaft 62. An angle iron pad 68 is welded to the rear surface of the upper pressure plate panel 21 and has a laterally extending flange. A radial arm 69 extends from the lower end of the shaft 63. The arm 69 has an elongated slot 70 therein. A connecting rod 71 extends from the flange of the pad 68 through slot 70 and is secured in one direction to the arm 69 by means of the nut 72. It will be noted that the rod 71 is free to move in an outward direction. However, the inner position of the panel 21 in respect to the passage 17 is limited by the position of the arm 69.

The linkage also extends from the shaft 62 to the upper panel 41 of the rear pressure plate structure. The linkage is composed of a vertically disposed shaft or rod 75 journaled, as indicated at 76, to the housing structure 10. The upper end of the shaft 75 has a radial arm 77 connected thereto with its outer end connected to a connecting rod 78 extending to a radial arm 79 mounted on the shaft 62. The lower end of the shaft 75 is connected to the upper pressure plate structure 41 by means of a pad 80 welded to the rear surface of the panel 41 and having an outwardly extending lateral flange. An arm 81 is fixed to the lower end of the shaft 75 and is connected to the pad 80 by means of a rod 82. The arm 81 is provided with a slot 83 through which the rod 82 extends. A nut 84 is provided on the end of the rod 82 and limits the inward position of the pressure plate 41. Movement of the arm 81 away from the passage 17 will, of course, move the pressure plate 41 and its extension 43 away from the passage 17. Movement of the arm 81 toward the passage will not in and of itself move the pressure plate 41 toward the passage, but the fingers 52 will bias the panel 41 toward the passage 17.

Referring again to the arm 79 and to FIG. 1, it will be noted that the arms 67 and 79 are fixed to a pipe 90 carried on the shaft 62. The pipe also operates as a spacer between the bracket structures 60, 61. The pipe 90 has a third upwardly projecting arm 93. A bracket structure 94 is mounted on the upper plate 13 and supports an hydraulic cylinder 95 having a rod 96 connected to the upper portion of the arm 93. It is clearly evident that extension or retraction of the cylinder 95 and its rod 96 will create a rocking motion in the pipe 62 and be transmitted as a force moving the respective upper pressure plates 21, 41 respectively. Movement of the arm 93 forwardly, occurring upon extension of the rod 96, will move the pressure plates 21, 41 away from or outwardly as respects the passage 17.

The hydraulic cylinder 95 receives its power or fluid under pressure from a fluid supply indicated at 100 that may be of any conventional type mounted on a tractor or on the conventional type cotton harvester. A control valve 101 extends between the power source 100 and the hydraulic cylinder for controlling the fluid in lines 102, 103 leading to opposite ends of the cylinder 95. The control valve or mechanism 101 as well as the fluid source 100 is shown only in representative form in FIG. 1. Generally it should be recognized that the control mechanism 101 will be at a point remote from the cotton harvester and more ideally will be positioned adjacent the operator's station.

In operation the improvement will best be utilized in a field in which there is variation in the degree of ripeness of the plants. For example, there will be in cotton fields due to various conditions, a situation in which part of the plants will be completely ripened and part of the plants will have only their lower bolls ripened. By use of the present device or improvement, an operator seeing that he is entering into an area of a field in which the ripe cotton bolls are only on the lower portion of the plant, will operate the control mechanism 101 to move the upper pressure plates 21 and 41 outwardly as respects the passage 17. This will force the upper pressure plates or panels 21, 41 to move away from the upper spindles 16, 36 of the drums 15 and 35. Without the gentle pressure of the pressure plates 21 and 41, the spindles 16, 36 will be less aggressive and will have less chance of dislodging the greener cotton bolls from the plants.

Upon the operator moving the harvester into a portion of a field more completely ripened, the hydraulic cylinder 95 will be retracted and the pressure plates 21, 41 be permitted to move into their normal alined position above the lower panels 20, 40. Since the rods 70, 82 and arms 69, 81 are designed only to draw the plates away from the plant passage 17, the springs 32, 52 will retain the upper plates 21, 41 in their normally alined positions.

While only one form of the invention has been shown, it should be recognized that other forms and variations will occur to those skilled in the art. Therefore, while the present form has been shown and described in detailed manner for purposes of concisely illustrating the principles of the invention, it should be understood it is not the intention to limit or narrow the claims beyond the broad concept set forth in the appended claims.

What is claimed is:

1. In a housing structure for a cotton harvester having a fore-and-aft extending plant receiving passage, the improvement comprising: upright wall structure adjacent to and defining at least a portion of one side of the passage composed of upper and lower vertically disposed fore-and-aft extending plates; means mounting the plates on the housing structure for lateral movement as respects the passage; means on the housing structure yieldably resisting outward movements of the plates relative to the passage; and power means on the housing structure connected to the upper plate adjustable to effect lateral outward positioning of the latter relative to the lower plate.

2. In a housing structure for a cotton harvester, having a fore-and-aft extending plant receiving passage, the improvement comprising: upright wall structures adjacent to and defining at least portions of each side of the passage composed of upper and lower vertically disposed fore-and-aft extending plates; means mounting the plates on the housing structure for lateral movement as respects the passage; means on the housing structure yieldably resisting outward movements of the lower plates relative to the passage; and the power means on the housing structure connected to the upper plates adjustable to effect lateral outward positioning of the latter relative to the lower plates.

3. The invention defined in claim 2 in which the power means includes a hydraulic cylinder supported on the housing with means connecting it to the respective plates.

4. In a housing structure for a cotton harvester, having a fore-and aft extending plant receiving passage, the improvement comprising: upright wall structure adjacent to and defining at least a portion of the passage composed of vertically disposed fore-and-aft extending plates; means mounting the plates on the housing structure for lateral movement as respects the passage; means on the housing structure yieldably resisting outward movements of the plates relative to the passage; and means exterior of the housing structure connected to at least one of the plates and adjustable to move the latter outwardly relative to the passage.

5. In a housing structure for a cotton harvester, having a fore-and-aft extending plant receiving passage, the improvement comprising: upright wall structure adjacent to and defining at least a portion of the passage composed of vertically disposed fore-and-aft and upper and lower extending plates; means mounting the plates on the housing structure for lateral movement as respects the passage; and means connected to at least one of the plates adjustable to move the latter outwardly relative to the passage.

6. In a housing structure for a cotton harvester having a fore-and-aft extending plant receiving passage, the improvement comprising; upright fore-and-aft disposed wall structure defining at least a portion of the passage side yieldably supported on the housing structure to move outwardly in respect to the passage, a rockable member on the housing structure; means behind the wall structure connecting the rockable member to the wall structure whereby rocking of the member will effect movement of the wall structure to vary the width of the passage; and a control device remote from the member for positively and selectively rocking the member.

7. In a housing structure for a cotton harvester having a fore-and-aft extending plant receiving passage, the improvement comprising: upright fore-and-aft disposed wall structure defining at least a portion of the passage side yieldably supported on the housing structure to move outwardly in respect to the passage, a movable member on the housing structure; means behind the wall structure connecting the member to the wall structure whereby movement of the member will effect movement of the wall structure to vary the width of the passage; and a control device remote from the member for positively and selectively moving the member.

8. The invention defined in claim 7 in which the member is a rockable arm supported on the housing structure behind the wall structure, and the means connecting the member to the wall structure includes a lost motion connection whereby the wall structure may yield outwardly from the passage independent of movement of the rockable member.

References Cited by the Examiner
UNITED STATES PATENTS

| | | | |
|---|---|---|---|
| 2,803,938 | 8/1957 | Thomann | 56—41 |
| 2,830,427 | 4/1958 | Odom | 56—44 |
| 3,103,092 | 9/1963 | Templeton | 56—44 |

ABRAHAM G. STONE, *Primary Examiner.*

T. GRAHAM CARVER, RUSSELL R. KINSEY, *Examiners.*

M. C. PAYDEN, *Assistant Examiner.*